(12) United States Patent
Gadiyar et al.

(10) Patent No.: US 7,823,642 B2
(45) Date of Patent: Nov. 2, 2010

(54) CONTROL OF FINES MIGRATION IN WELL TREATMENTS

(75) Inventors: Balkrishna Gadiyar, Katy, TX (US); Erik B. Nelson, Houston, TX (US); Juan-Carlos Santamaria, Houston, TX (US); Brent Busby, Richmond, TX (US); Philip F. Sullivan, Bellaire, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 34 days.

(21) Appl. No.: 12/212,509

(22) Filed: Sep. 17, 2008

(65) Prior Publication Data

US 2009/0111718 A1    Apr. 30, 2009

Related U.S. Application Data

(63) Continuation-in-part of application No. 11/861,894, filed on Sep. 26, 2007.

(51) Int. Cl.
*E21B 33/138* (2006.01)
*E21B 43/22* (2006.01)

(52) U.S. Cl. .................. 166/293; 166/276; 166/300

(58) Field of Classification Search .............. None
See application file for complete search history.

(56) References Cited

U.S. PATENT DOCUMENTS

| | | | |
|---|---|---|---|
| 4,291,766 A | 9/1981 | Davies | |
| 4,427,069 A | 1/1984 | Friedman | |
| 4,669,543 A | 6/1987 | Young | |
| 5,199,492 A | 4/1993 | Surles | |
| 5,330,005 A | 7/1994 | Card et al. | |
| 5,439,055 A | 8/1995 | Card et al. | |
| 5,501,275 A | 3/1996 | Card et al. | |
| 5,551,514 A | 9/1996 | Nelson et al. | |
| 5,775,425 A | 7/1998 | Weaver et al. | |
| 5,805,593 A | 9/1998 | Busche | |
| 5,833,000 A | 11/1998 | Weaver et al. | |
| 5,839,510 A | 11/1998 | Weaver et al. | |
| 5,853,048 A | 12/1998 | Weaver et al. | |
| 5,871,049 A | 2/1999 | Weaver et al. | |
| 5,919,739 A * | 7/1999 | Sunde et al. | 507/213 |
| 6,047,772 A | 4/2000 | Weaver et al. | |
| 6,450,260 B1 | 9/2002 | James et al. | |
| 6,613,720 B1 | 9/2003 | Feraud | |
| 7,013,973 B2 | 3/2006 | Danican et al. | |
| 7,111,683 B2 | 9/2006 | Nelson | |
| 2004/0149431 A1* | 8/2004 | Wylie et al. | 166/242.1 |

OTHER PUBLICATIONS

SPE27345—B.G. Sharma and M.M Sharma, Polymerizable Ultra-Thin Films: A New Technique for Fines Stabilization; Society of Petroleum Engineers; Feb. 7-10, 1994; pp. 63-74; Presented at the SPE International Symposium on Formation Damage Control in Lafayette, Louisiana.

* cited by examiner

*Primary Examiner*—Zakiya W. Bates (57) ABSTRACT

A treatment fluid that can be used for treating a subterranean formation penetrated by a wellbore is prepared from a primary treatment fluid component and an emulsion component mixed with the primary treatment fluid component. The emulsion component has an oil phase and an aqueous phase. The emulsion component comprising a source of insoluble silica particles and a source of calcium hydroxide, wherein the source of calcium hydroxide is present in the oil phase, and the source of insoluble silica particles are contained in the aqueous phase. The method is carried out by contacting at least a portion of the formation with the treatment fluid.

21 Claims, 4 Drawing Sheets

CONTROL OF FINES MIGRATION IN WELL TREATMENTS

CROSS-REFERENCE TO RELATED APPLICATIONS

This application is a continuation-in-part of U.S. application Ser. No. 11/861,894, filed Sep. 26, 2007, which is hereby incorporated by reference in its entirety.

FIELD OF THE INVENTION

The invention relates to oilfield treatment fluids and methods for their use. Specifically, the invention relates to methods and compositions for control of small particle and fines migration.

BACKGROUND

The statements in this section merely provide background information related to the present disclosure and may not constitute prior art.

Hydrocarbon fluids, such as oil and natural gas, and other desirable formation fluids are obtained from a subterranean geologic formation, i.e., a reservoir, by drilling a well that penetrates the formation zone that contains the desired fluid. Once a wellbore has been drilled, the well must be completed. A well "completion" involves the design, selection, and installation of equipment and materials in or around the wellbore for conveying, pumping, or controlling the production or injection of fluids. After the well has been completed, production of the formation fluids can begin.

When the subterranean formation is "soft" or poorly consolidated, small particulates (typically sand) present in the formation may dislodge and travel along with the produced fluid to the wellbore. Sand particles typically have a particle size between about 44 microns (0.044 mm) to several millimeters. Production of sand is highly undesirable since it erodes surface and subterranean equipment, and it must be removed from the produced fluids before they can be processed. In addition, the migrating sand can plug the flow channels in the formation and thereby necessitate other stimulation techniques, such as acid stimulation, to restore the well's performance.

Various methods have been employed to reduce or eliminate the concurrent production of sand and other particulates with the formation fluids. One common approach has been to filter the produced fluids through a gravel pack that has been placed into the wellbore. Such gravel packs are often retained by a metal screen. The produced formation fluids travel through the permeable gravel pack (and the screen) before entering the wellbore. The sand and other particulates in the produced fluids are blocked by the gravel pack. This technique has been widely used in the past, but it has several disadvantages. With time, the gravel pack and the screen may be plugged by scale or particles, or badly eroded by the sand and other particulates in the produced fluids. This reduces the effectiveness of the gravel pack and screen and may actually shut down the production if the gravel pack and/or screen becomes plugged with sand or formation fines. In addition, the presence of the metal screen in the well inhibits reentry of drills and other tools into the wellbore and the metal screen can be difficult and costly to remove, which as led to the industry's development of so-called screenless completion techniques.

Many systems have been proposed for sand consolidation systems in oilfield applications but, to date, a completely satisfactory product has not been introduced and accepted by the industry. These techniques typically involve the injection of a consolidating fluid, such as a resin-based consolidating fluid, through the wellbore and into the formation surrounding the interval of interest. Resin-based consolidating fluids generally include an organic resin, a curing agent, a catalyst and an oil wetting agent. The resin system hardens in the formation, thereby consolidating it. Some systems chemicals are pumped in stages, creating a complicated treatment procedure. Most sand-consolidation techniques involve epoxy- or furan-based resins. When the individual components of the consolidating fluid are pumped as different stages into the formation they may or may not come together in the correct order, in the correct amounts, or they may not even come together at all. And, if they do come together, good mixing of the components is not assured. Thus, there is no guarantee that after placement, the chemicals have been distributed evenly throughout the near-wellbore region. Because of the complexity and unreliability of these systems, single stage consolidation treatments have been long desired by the industry.

Single-stage consolidation systems have been directed toward screenless completions. Screenless completions involving formation consolidation were disclosed by Nelson et al. in U.S. Pat. No. 5,551,514, incorporated herein by reference thereto. The concept in such systems was to consolidate the formation around perforations using a single-stage flexible gel system. Following the consolidation step, the formation permeability surrounding the treated interval is too low to allow the practical production of hydrocarbons. Therefore, the system required performing a fracturing/packing ("frac-pack") treatment using curable resin coated proppant, or conventional proppant containing fibers, through the sand pack. After the frac pack, the proppant pack in the perforations would prevent the entry of gravel into the wellbore, and the sand surrounding the perforations would be consolidated and unable to enter the wellbore. This disclosure envisioned the use of conventional resins.

A gel component and a gel forming agent for use as a sand consolidation medium for screenless completions has been disclosed, but a drawback is that the consolidated sand pack is so impermeable, fracturing may not be feasible there through. In addition, diversion is difficult. Another problem with these systems is incompatibility with brines. Frequently, highly saline completion fluids are present in the wellbore during sand-consolidation treatments.

In some instances, silica and calcium hydroxide are combined and reacted to form a cementitious calcium silicate gel. This process is commonly known as a "pozzolanic reaction." This technique may involve separation of the chemical reagents from each other and from brines that are normally present in the wellbore. If the silica and calcium hydroxide contact each other before entering the sand pack, the reaction can begin prematurely in the wellbore. In addition, calcium hydroxide crystals tend to nucleate and grow, limiting their ability to penetrate the pores between sand grains. Also, if the silica component is deployed as colloidal silica, it can precipitate on contact with brine in the wellbore.

Additionally, Feraud et al. (U.S. Pat. No. 6,613,720), incorporated by reference in its entirety, discloses a wide range of controlled release techniques using emulsions. In this patent, the inventors disclosed controlled release of chemicals by stabilizing the active ingredients in the discontinuous phase of an emulsion, which is then destabilized by a number of different triggers.

In U.S. patent application Ser. No. 11/861,894, filed Sep. 26, 2007, which is herein incorporated by reference in its entirety, an emulsion containing both silica and calcium hydroxide particles is used as a single stage sand consolidation system without destabilization when the particles are isolated by placing them in different phases of the emulsion.

While the above systems and methods have been found particularly useful in consolidating of larger unconsolidated sand particles, the transport of smaller particulate solids and fines during the production of hydrocarbons from a subterranean formation is also a continuing problem where the consolidation of the larger sand particles may not be of primary concern. These small particulates, which may be formed from fine clay and silt particles, can also erode or cause significant wear in hydrocarbon production equipment during production and recovery. The fines may move freely and congregate within the interstices of sand grains or proppants, and or pass unhindered through sand screens in the wellbore. These smaller solids can also clog or plug the formation or wellbore, thereby limiting or completely stopping fluid production. Further, the transported particulates must be separated from the recovered hydrocarbons, adding further expense. The smaller particulates may be naturally present in the formation or result from well-stimulation treatments during which proppant is introduced into the formation.

To control such small particles and fines migration, additional treatment steps or stages designed and conducted specifically for such purposes may be required. This adds to the time and cost of production of the well.

What is therefore needed are compositions and methods for controlling the migration of fines or small particulates and that can carried without requiring additional treatment steps.

SUMMARY

In some other aspects, embodiments include methods of treating a subterranean formation penetrated by a wellbore wherein a treatment fluid includes a primary treatment fluid component and an emulsion component mixed with the primary treatment fluid component. The emulsion component has an oil phase and an aqueous phase, where the emulsion component contains a source of insoluble silica particles and a source of calcium hydroxide. The calcium hydroxide is present in the oil phase, and the insoluble silica particles are contained in the aqueous phase. Then, at least a portion of the formation is contacted with the treatment fluid.

In yet some other embodiments, methods of fine particle control in a subterranean formation penetrated by a wellbore are disclosed. The method includes providing a treatment fluid containing an emulsion component having an oil phase and an aqueous phase. The emulsion component has an oil phase and an aqueous phase, where the emulsion component contains a source of insoluble silica particles and a source of calcium hydroxide. The calcium hydroxide is present in the oil phase, and the insoluble silica particles are contained in the aqueous phase. Then, treatment fluid is introduced into the wellbore.

BRIEF DESCRIPTION OF THE DRAWINGS

For a more complete understanding of the present invention, and the advantages thereof, reference is now made to the following descriptions taken in conjunction with the accompanying figures, in which.

DESCRIPTION OF THE INVENTION

The amount of the silica source and calcium hydroxide source can be varied. The stoichiometry of the pozzolanic reaction between the components is variable. Normally, a $CaO/SiO_2$ mole ratio of from about 0.8 to about 2.5 is used. A mole ratio of $CaO/SiO_2$ of from about 1 to about 2 is one useful example; and a mole ratio of from about 1.3 to about 1.5 of such materials is another useful example. The components may be blended "on-the-fly" using equipment on the surface to pump the emulsion into the wellbore, or may be prepared in advance of the treatment.

The silica source component in the aqueous system may be any of the known family of materials known as pozzolans, provided that the particle size is small enough to enter the pores of the region being treated. A pozzolan is defined as a siliceous or siliceous and aluminous material, which in itself possesses little or no cementitious value but that will, in finely divided form and in the presence of moisture (i.e., water), chemically react with calcium hydroxide to form compounds (i.e., calcium silicate hydrate gels) that do possess cementitious properties. Pozzolans can be silica fume, fumed silica, precipitated silica, colloidal silica, calcined clay, fly ash, blast furnace slag, and the like. Colloidal silica, silica fume and fumed silica are particularly useful pozzolans, based on cost and availability. Colloidal silica systems are commercially available at concentrations of from about 15 to about 50 weight percent (wt. %) silica. Such silica systems can be used as such or diluted with water, if desired, to about 2 wt. %, but concentrations of from about 25 to about 50 wt. % may be used to reduce the amount of fluid pumped into the formation in embodiments of the present invention. The colloidal silicas useful herein typically have particle sizes less than about 1 μm. The nominal particle diameter of silica fume or fumed silica ranges from about 9 to about 30 nm.

The source of calcium hydroxide may also be any known source material. The size of the calcium hydroxide material is dependent on the type of particles or fines in the formation, the size of the particles and the voids in the formation. In many, if not most, current commercial calcium hydroxides, the particles are too large to be useful. Calcium hydroxide particles/crystals should be of suitable size so as to enter the pores of the formation, generally no more than about 50 percent of the average pore size of the average void in the foundation, and in some embodiments, no more than about 30 percent of the average pore size. The calcium hydroxide particles may have a particle size of from about 1 μm to about 11 μm.

The calcium hydroxide component may be prepared using a calcium hydroxide powder. The calcium hydroxide component may also be provided by blending a soluble calcium salt (e.g., calcium chloride or calcium chloride hydrate) with an aqueous inorganic base (e.g., aqueous sodium hydroxide) to form calcium hydroxide in situ within the wellbore as the system is being pumped and/or within the pores of the formation. Aqueous solutions of the calcium salt (e.g., calcium chloride) are used at concentrations of from about 1 to about 50 weight percent (wt. %), and in some embodiments, from about 20 to about 50 wt. %. Aqueous solutions of the inorganic base (e.g., sodium hydroxide) may be used in embodiments of the invention at concentrations of from about 1 to about 50 weight percent (wt. %), and in some embodiments from about 20 to about 50 wt. % may be used.

In preparing the emulsion, the silica source is dispersed in an aqueous phase. The aqueous phase may be prepared from fresh water or a brine. The silica source may provide a silica content within the aqueous phase of from about 40% to about 50% by weight of the aqueous phase. Surfactants may be used in the aqueous phase to disperse the silica and to facilitate formation of the aqueous micelles of the emulsion. The surfactants may be used in an amount of from about 2 to about 10% by weight of the oil phase. Examples of suitable surfactants include fatty acid esters. An example of a suitable commercially available surfactant is Baker Petrolite® A3970, available from Baker Hughes Incorporated, which is a proprietary fatty acid ester. One or more different surfactants may be used in the aqueous phase. If colloidal silica is used, the colloidal silica may be used as is without further surfactants in some applications. An example of suitable commercially colloidal silica is that available as LUDOX™ HS-40, available from W. R. Grace, which is a 40 wt % suspension of silica in water.

The calcium hydroxide source may be dispersed in the oil phase. The oil phase will typically form the external phase of the emulsion. Suitable fluids for the oil phase include diesel, mineral oil, vegetable oil, kerosine_hexane, decane, xylene, and the like. The calcium hydroxide source may provide a calcium hydroxide content within the oil phase of from about 5% to about 10% by weight of the oil phase. Surfactants may be used in the oil phase to generate a water-in-oil emulsion and/or to suspend calcium hydroxide in the oil phase. One or more different surfactants may be used in the oil phase. The surfactants may be used in an amount of from about 1 to about 10% by weight of the oil phase. Some examples of suitable commercially available surfactant are Hypermer™ 2422, available from Uniqema, which is a poly(isobutylene) ethanolamide, as well as and Hypermer™ 2524.

Each of the aqueous and oil phase may be prepared separately and then combined together to form the emulsion. As discussed earlier, the emulsion can be a water-in-oil emulsion with an oil-to-water ratio of from about 30/70 to about 60/40, including ratios therebetween. This may aid in protecting the colloidal silica from contacting brine or a treatment fluid before the system contacts and/or penetrates the formation.

The emulsion containing the silica and calcium hydroxide sources may be combined with a primary treatment fluid component to form a treatment fluid. The emulsion may be used in an amount of from about 2 vol. % or more of the total treatment fluid, with from about 5 vol. % to about 10 vol. % of the total treatment fluid being more typical.

The primary treatment component may be those treatment fluids commonly used in fracturing, matrix treatments, frac-packs, perforating treatments, etc. Such treatment fluids may be non-acid treatment fluids, however, because acid treatment fluids, such as those used in acid fracturing and matrix acidizing, may react with the calcium hydroxide and interfere with or inhibit the formation of the calcium silicate hydrate gel used in preventing fines migration. The primary treatment fluid component may be any fluid, with the exception of the acid fluids, typically used in well treatments.

The primary treatment fluid component may be aqueous fluids, such as fresh water, salt water or a brine. The fluid may further contain a viscosifying agent. The viscosifying agent may be a hydratable polymer that is either crosslinked or a non-crosslinked polymer, a viscoelastic surfactant, or any combination thereof. Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CM-HPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers are used typically for high-temperature applications. Nonlimiting examples of suitable viscoelastic surfactants useful for viscosifying some fluids include cationic surfactants, anionic surfactants, zwitterionic surfactants, amphoteric surfactants, nonionic surfactants, and combinations thereof. Other viscosifying agents that are well known to those skilled in the art may be used as well.

The treatment fluid, which contains the emulsion component, may also include proppant particles that are substantially insoluble in the fluids of the formation. Such treatment fluids containing proppant typically contain a viscosifying agent, such as those discussed previously, to prevent settling of the particles. The proppant particles may be used in fracturing treatments wherein the proppant particles are carried by the treatment fluid and remain in the fracture created, thus propping open the fracture when the fracturing pressure is released and the well is put into production. Proppant particles may also be used with the treatment fluid in gravel packing. In this operation, strategically sized gravel particles are deposited in the near-wellbore region. Gravel packs are created to act as "filters" that prevent formation sand from entering the well bore during production. The treatment fluids may also be used in frac-and-pack operations wherein short and wide fractures are created to bypass near-wellbore region, which may be damaged, followed by deposition of a gravel pack for sand control. Viscosity is typically generated in such aqueous stimulation fluids by employing crosslinked high molecular weight polymers and/or viscoelastic surfactants.

Any proppant or gravel can be used for such treatments, provided that it is compatible with the formation, the fluid, and the desired results of the treatment. Proppants and gravels in the same or different wells or treatments can be the same material and/or the same size as one another and the term "proppant" is intended to include gravel in this discussion. In general the proppant used will have an average particle of from about 0.15 mm to about 2.5 mm, more particularly, but not limited to typical size ranges of about 0.25-0.43 mm, 0.43-0.85 mm, 0.85-1.18 mm, 1.18-1.70 mm, and 1.70-2.36 mm. Normally the proppant will be present in the treatment fluid in a concentration of from about 0.12 kg proppant added to each L of carrier fluid to about 3 kg proppant added to each L of carrier fluid, more particularly from about 0.12 kg proppant added to each L of carrier fluid to about 1.5 kg proppant added to each L of carrier fluid. As used herein, "carrier fluid" refers to the treatment fluid components not comprised of proppant.

Such proppants (gravels) can be natural or synthetic, coated, or contain chemicals; more than one can be used sequentially or in mixtures of different sizes or different materials. Proppants and gravels in the same or different wells or treatments can be the same material and/or the same size as one another and the term "proppant" is intended to include gravel in this discussion. Proppant is selected based on the rock strength, injection pressures, types of injection fluids, or even completion design.

Examples of proppant materials include, but are not limited to, sand, sintered bauxite, glass beads, ceramic materials, naturally occurring materials, or similar materials. Mixtures of proppants can be used as well. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc, some nonlimiting examples of which are proppants supplied under the tradename LiteProp™ available from B J Services Co., made of walnut hulls impregnated and encapsulated with resins. Further information on some of the above-noted compositions thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

In the method of using the treatment fluids in accordance with the invention, the treatment fluid containing the primary treatment fluid component and the emulsion component is introduced into the formation through the wellbore. The treatment fluid may be pumped at a pressure below the formation fracturing pressure or above the fracturing pressure, where fracturing is desired. The primary treatment fluid component facilitates the primary treatment, i.e. facilitates fracturing, gravel packing, etc. The emulsion component within the treatment fluid will eventually break over a period of time in the formation, either through exposure to elevated temperatures, contact with sand or other structures during fluid flow or both. As the emulsion breaks, the colloidal silica and calcium hydroxide contact each other and react to form a calcium silicate hydrate gel. The formed gel thus facilitates trapping and confinement of small particles and fines so that they do not migrate through the proppant or gravel pack. The formation fines in contact with the emulsion are thereby incorporated into and/or bonded to the gel, which eventually hardens.

One of the advantages of embodiments of the present invention is that the operator does not have to use a separate treatment to that of the primary treatment to prevent small particle and fines migration. The treatment can be carried out in a single stage or step. However, in some cases, the operator may find it advantageous to circulate an aqueous system containing a minor amount of a clay stabilizer (e.g., tetraalkylammonium halides) through the well to remove contaminants in the well before injecting the treatment fluid. The portion, if any, of such aqueous systems remaining in the wellbore will be injected into the formation during the practice of the invention and can assist in stabilizing clays in the formation and thereby reduce formation damage. A postflush with such an aqueous medium may also be beneficial to clear the wellbore of any residual reactive silicon and calcium hydroxide components, such as may be the case for a new well. However, in some cases, the operator should be careful not to inject the post-flush into the formation because this would sweep the cementitious material away from the near-wellbore region. If the process is being used as a remedial treatment of an older well, however, the operator may wish to leave the wellbore at least partially filled with the reactive components and let the calcium silicate hydrate gel form in the wellbore (in addition to the interval surrounding the wellbore), for example. The operator can then drill through the gel plug that forms in the wellbore and re-perforate the casing. In this manner, old perforations are plugged with the gel and cementitious material, which acts as a diverter, and hydraulic fracturing can be done through the new perforations in the interval(s) of interest. Various phased perforation techniques and/or fracturing techniques can be beneficially applied to stimulate the production of formation fluids by fracturing through the consolidated formation, and proppant packs containing fibers or resin-coated materials such as proppant and/or fibers can also be beneficially used in the stimulation treatment. An exemplary proppant-retention agent is a fiber commercially available from Schlumberger under the tradename PropNET™. The proppant-retention agent keeps the proppant in the fracture, and the proppant and proppant-retention agent keep formation particles from being produced concurrently with the formation fluids. The proppant size may also be properly selected to exclude the formation sand, according to Saucier's criteria. This fracturing technique is illustrated, for example, in U.S. Pat. No. 6,450,260, the disclosure of which is incorporated herein by reference.

In some embodiments, the emulsion component may be readily prepared by agitating the oil and water mixtures for several minutes in a paddle mixer or other mixer. The emulsion component may then be added to the primary treatment fluid component with further mixing and/or agitation. The treatment fluid is then pumped into the wellbore in accordance with standard treatment techniques for the primary treatment.

The following examples are presented to illustrate the preparation and properties of compositions and methods of the invention, and should not be construed to limit the scope of the invention, unless otherwise expressly indicated in the appended claims. All percentages, concentrations, ratios, parts, etc. are by weight unless otherwise noted or apparent from the context of their use.

EXAMPLES

Test Procedure:

The following test procedure was employed in all examples:

Sand Pack Assembly

1. A sand pack assembly is formed by affixing a 100-mesh screen on each end of a flow distributor.

2. A first flow distributor is inserted and secured with hose clamps in one end of a length of 1" (2.54 cm) ID Tygon tubing and positioned vertically.

3. A 20/40 mesh (0.841 mm/0.420 mm) frac sand is added to the flow distributor until ¾ inch (1.91 cm) deep.

4. On top of the frac sand of Step 3 is added 30/70 mesh (0.595 mm/210 mm) frac sand and Hyalite blend as 12.5% Hyalite/87.5% sand) The blend was ground in the laboratory, and the Hyalite opal blend has a particle range of 0.001 mm-0.050 mm and a d(0.5) of 0.017-0.019 mm to achieve a total pack height of 6 inches (15.24 cm).

5. A second flow distributor is inserted into the Tygon tubing and secured with hose clamps.

6. The sand pack assembly is connected to a U-tube and the assembly is placed in a Hassler cell (also shown in FIG. 1).

Saturation and Initial Permeability

7. The cell is preheated to a test temperature of 150° F. (65.6° C.).

8. A confining pressure of 1000 psi (6895 kPa) is applied to the cell using a Gilson pump.

Figure 1:
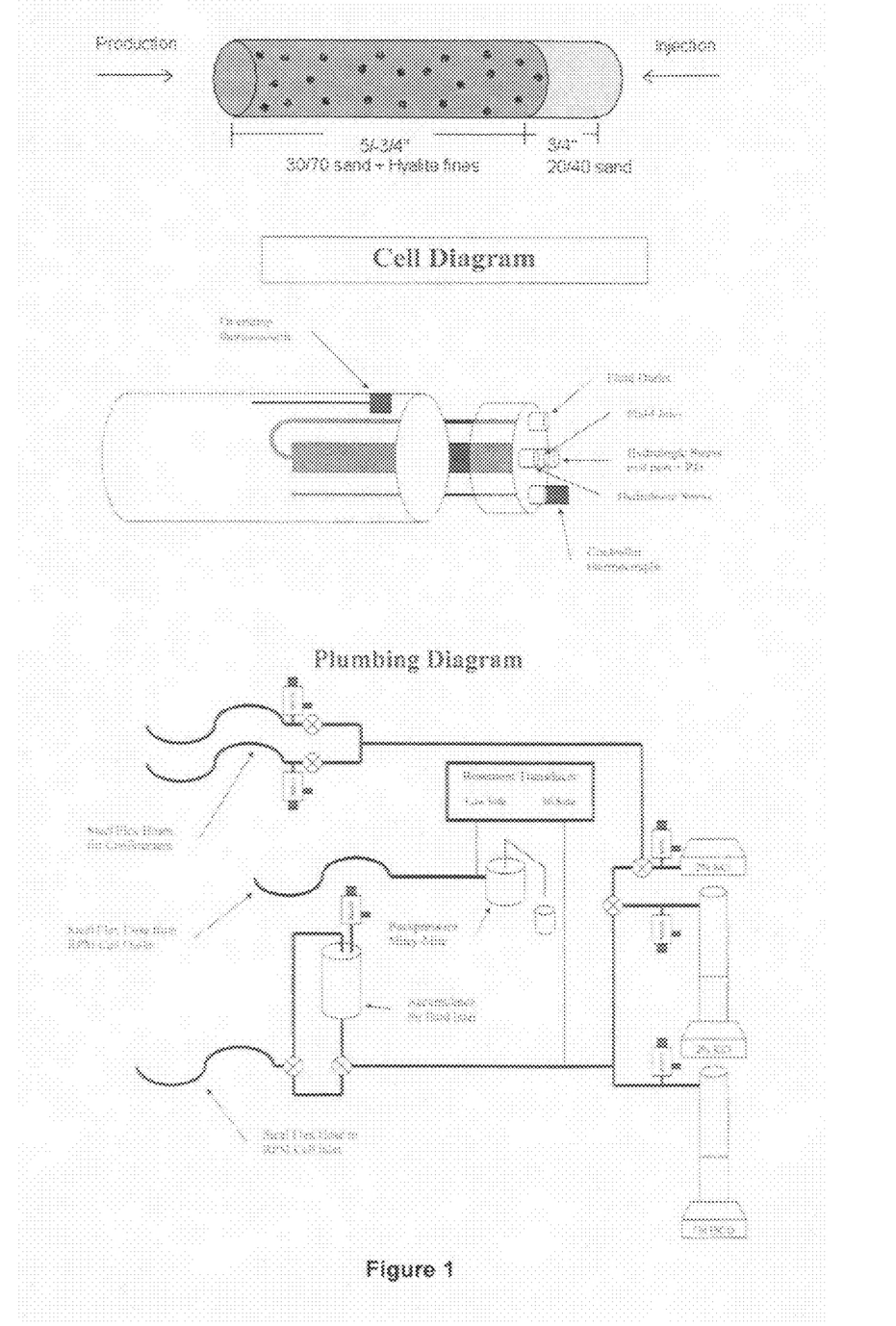
FIG. 1 is a schematic of sand pack assembly used in carrying out permeability tests of the examples.

9. The sand pack is saturated by flowing 500 mL of a 2% NaCl brine solution at 0.5 mL/min in the production direction, as shown in FIG. 1. This is typically done overnight.

10. An initial permeability is obtained at 2.0 mL/min with 2% NaCl brine in the production direction (200 ml is ~10 pore volumes).

Treatment Injection

11. An injection line is connected to the accumulator cell's (also shown in FIG. 1) exit port of the Hassler cell and the injection line to the Hassler cell is disconnected.

12. The emulsion treatment fluid is agitated for 5 to 10 minutes.

13. The accumulator is filled with an appropriate volume of emulsion fluid.

14. The treatment fluid is injected into the sand pack in the injection direction, as shown in FIG. 1, at 2.0 mL/min.

15. The emulsion is displaced with one or two pore volumes of 2% NaCl brine injected in the injection direction immediately following treatment placement to avoid solidification.

16. The sand pack is shut in and the pack is allowed to set for 8-12 hours at temperature and constant confining pressure.

Return Permeability and Hydrodynamic Effect

17. A 2% NaCl brine solution is flowed in the production direction at 2.0 mL/min.

18. The flow rate of the NaCl is increased to 4.0 mL/min and the pressure drop across the entire pack is measured for 200 mL (~10 pore volumes).

19. Effluent is collected for analysis of fines production. Analysis included turbidity, insoluble mass collected and fluorescents.

20. Steps 18 and 19 are repeated while increasing the flow rate.

Salinity Shock

21. De-ionized water is flowed in the production direction at 2.0 mL/min and differential pressure changes are recorded and the effluent collected.

22. Step 21 is repeated, increasing the flow rate.

Example 1

Figure 2:
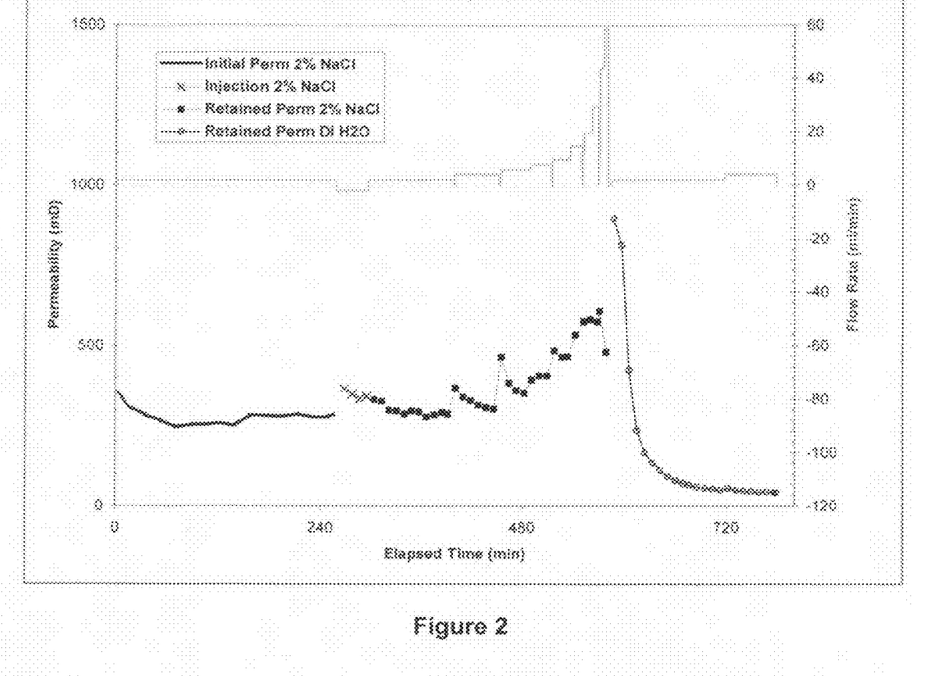
FIG. 2 is plot of the permeability of sand pack of Example 1 treated with a baseline fluid containing no emulsion for controlling fines migration.
Figure 3:
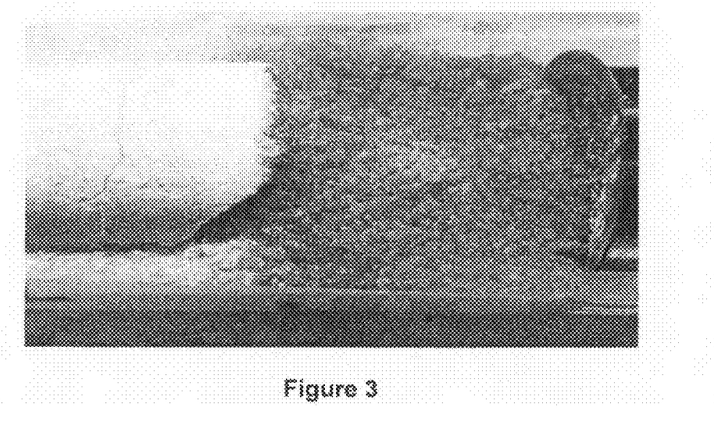
FIG. 3 is a photo of the sand pack of Example 1 treated with the baseline fluid with no emulsion.

Using the procedures described above, a baseline test was conducted to measure fines migration in an untreated sand pack using a NaCl brine. FIG. 2 shows the sand-pack permeability during the various stages of the test over time. The FIG. 2 plot displays both the retained permeability at 2.0 mL/min and the hydrodynamic effects of increasing the flow rate. The permeability increased with the flow rate. After the shock, the permeability dropped significantly. FIG. 3 shows the sand pack and shows evidence of fines migration. The hyalite crystal in the fines portion of the sand core fluoresce when illuminated by UV light (254 nm) and one can see that the crystals flowed into the 20/40 sand, as shown by the solid mass to the left of the sand pack in FIG. 3.

Example 2

A treatment fluid emulsion was prepared and tested using the procedure described above. A 5% by volume of a Uniquema Hypermer 2422 surfactant was added to diesel. The surfactant readily dispersed and dissolved. Calcium hydroxide powder, available as Aldrich Product No 239232, with a mean particle size of 11 μm was dispersed in 5 mL of the diesel solution at a concentration of 5.0 g/100 mL.

Separately, an aqueous colloidal silica and surfactant was prepared in a separate container using 5 mL of colloidal silica suspension containing 40 wt. % silica, available as LUDOX HS-40, and 5% by volume of a surfactant, available as Baker Petrolite A2970. The surfactant dispersed the colloidal silica suspension but did not precipitate the suspension or cause the suspension to gel. The calcium hydroxide/diesel and aqueous silica suspension were combined to make an oil external emulsion with a volumetric oil/water ratio of approximately 60/40.

Figure 4:
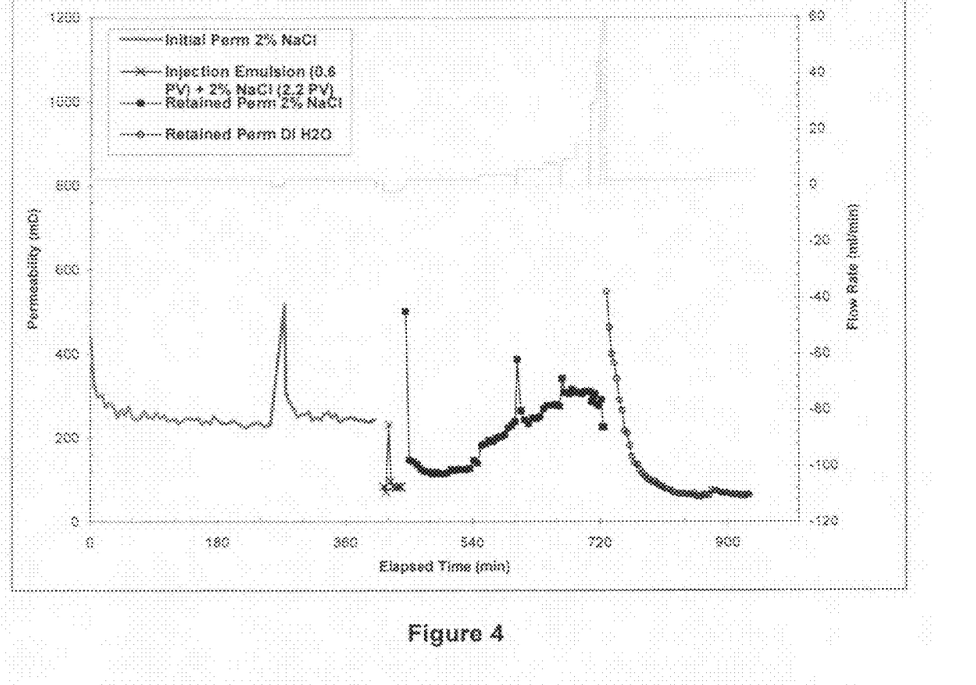
FIG. 4 is a plot of the permeability of a sand pack of Example 2 treated with 0.5 pore volumes of a treatment fluid containing an emulsion for fines migration.
Figure 5:
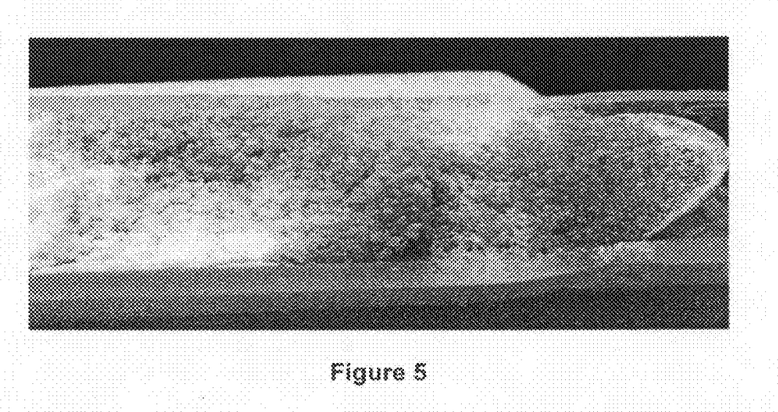
FIG. 5 is a photo of a sand pack of Example 2 treated with 0.5 pore volumes of the treatment fluid containing the emulsion.

The emulsion was then injected in a fresh core at 0.5 pore volumes. This was followed by a 2% NaCl brine flush. The core permeability plot is shown in FIG. 4. As can be seen in FIG. 4, the core permeability was higher at the end of the test compared to that from the baseline of Example 1. Less fines migration was also observed, as shown in FIG. 5.

Example 3

Figure 6:
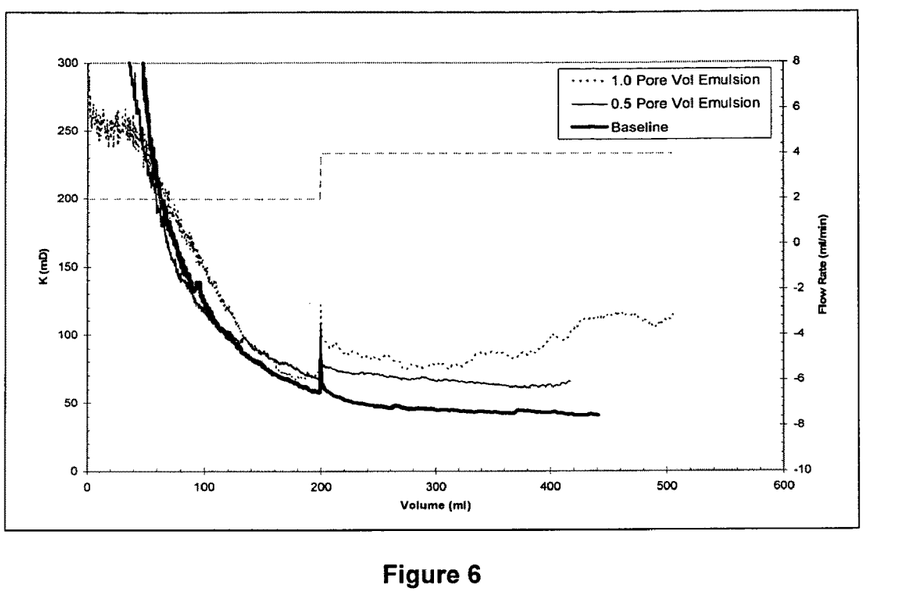
FIG. 6 is a plot of a sand pack of Example 3 treated with 1 pore volume of a treatment fluid containing the emulsion.

The emulsion from Example 2 was injected into a fresh core at 1 pore volume. The results are presented in FIG. 6, which also shows the results from Examples 1 and 2 for comparison. As can be seen in FIG. 6, the core permeability at the end of the test was higher than the baseline and that using 0.5 pore volumes of emulsion.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a subterranean formation penetrated by a wellbore, the method comprising:
providing a treatment fluid comprising a primary treatment fluid component and an emulsion component mixed with the primary treatment fluid component, the emulsion component having an oil phase and an aqueous phase, the emulsion component comprising a source of insoluble silica particles and a source of calcium hydroxide, wherein the source of calcium hydroxide is present in the oil phase, and the source of insoluble silica particles are contained in the aqueous phase, wherein the molar ratio of calcium hydroxide to silica is from about 0.8 to about 2.5; and
contacting at least a portion of the formation with the treatment fluid.

2. The method of claim 1, wherein:
the emulsion component is present within the treatment fluid in an amount of from about 5% to about 10% by volume of the treatment fluid.

3. The method of claim 1, wherein:
the oil phase is external and the aqueous phase is internal.

4. The method of claim 1, wherein:
the oil to water ratio of the emulsion component is from about 30/70 to about 60/40.

5. The method of claim 1, wherein:
the silica source is a pozzolan.

6. The method of claim 1, wherein:
the silica source is selected from fumed silica, precipitated silica, colloidal silica, calcined clay, fly ash and blast furnace slag.

7. The method of claim 1, wherein:
the molar ratio of calcium hydroxide to silica is from about 1 to about 2.

8. The method of claim 1, wherein:
the primary treatment fluid component is an aqueous fluid.

9. The method of claim 1, wherein:
the primary treatment fluid component contains a viscosifier.

10. The method of claim 1, wherein:
the primary treatment fluid component is a brine.

11. A method of fine particle control in a subterranean formation penetrated by a wellbore, the method comprising providing a treatment fluid comprising an emulsion component having an oil phase and an aqueous phase, the emulsion component comprising a source of insoluble silica particles and a source of calcium hydroxide, wherein the source of calcium hydroxide is present in the oil phase, and the source of insoluble silica particles are contained in the aqueous phase; and
introducing the treatment fluid into the wellbore.

12. The method of claim 11, further comprising introducing the treatment fluid into the formation.

13. The method of claim 12, wherein the formation is subject to fines migration.

14. The method of claim 12 wherein the introduction into the formation is effective to inhibit fines migration in the formation.

15. The method of claim 12 comprising introducing the emulsion component into the treatment fluid in an amount from about 5% to about 10% by volume of the treatment fluid, wherein the oil to water ratio of the emulsion component is from about 30/70 to about 60/40.

16. The method of claim 12, further comprising reacting the silica with the calcium hydroxide in the formation to form a calcium silicate gel.

17. The method of claim 12 wherein the silica particles have a size less than 1 micron and the calcium hydroxide source comprises particles having a size less than 50 percent of the average pore size of the formation.

18. The method of claim 12 wherein the calcium hydroxide source comprises particles having a particle size from about 1 micron to about 11 microns.

19. The method of claim 12 wherein the calcium hydroxide source comprises the product of blending a soluble calcium salt with an aqueous inorganic base.

20. The method of claim 19 further comprising forming calcium hydroxide in the wellbore, the formation or a combination thereof.

21. A method of fine particle control in a subterranean formation penetrated by a wellbore, the method comprising:
pumping a treatment fluid into the wellbore, wherein the treatment fluid comprises an emulsion component having an oil phase and an aqueous phase, the emulsion component comprising a source of insoluble pozzolan silica particles and a source of calcium hydroxide, wherein the source of calcium hydroxide is present in the oil phase and comprises the product of blending a soluble calcium salt with an aqueous inorganic base, wherein the source of calcium hydroxide comprises particles with a size between 1 and 11 microns, and wherein the source of insoluble pozzolan silica particles have a size less than 1 micron and are contained in the aqueous phase; and
introducing the treatment fluid into the pores of the formation to inhibit fines migration in the formation, wherein the source of calcium hydroxide particles comprising a particle size less than 50 percent of the average pore size;
reacting the soluble calcium salt with the aqueous inorganic base in the wellbore, the formation or a combination thereof to form calcium hydroxide;
reacting the calcium hydroxide with the insoluble pozzolan silica particles in the formation to form a compound with cementitious properties;
increasing permeability of the formation; and
producing fluid from the formation into the wellbore.

* * * * *